Figure 1:
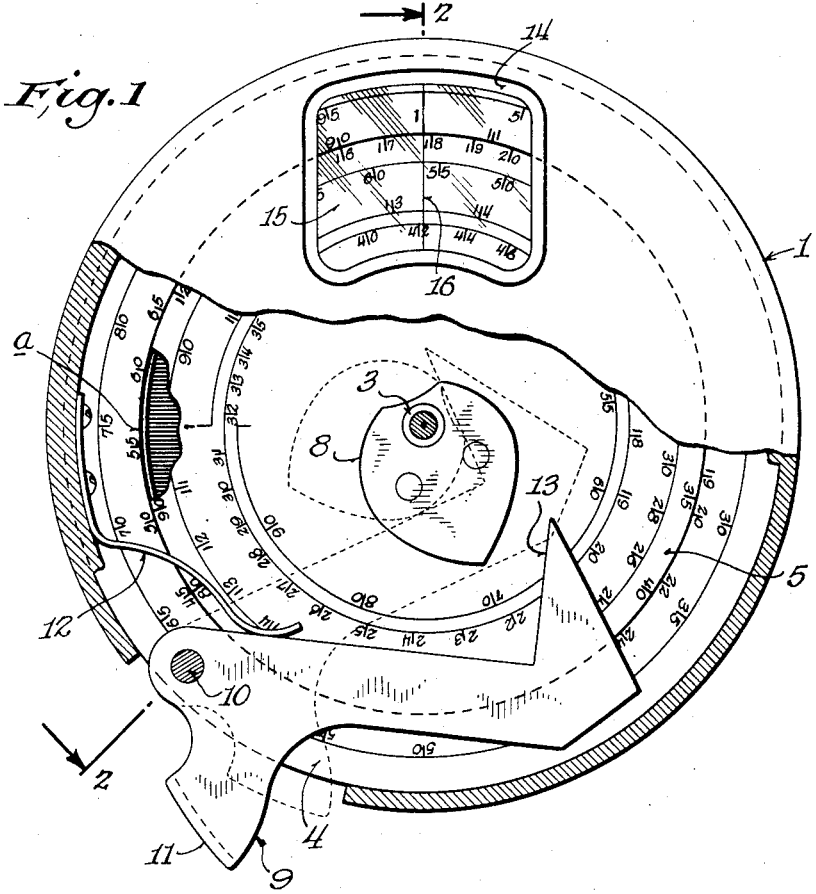

Dec. 2, 1941.  E. A. RAVENSCROFT  2,264,406

RESET SLIDE RULE

Filed Sept. 5, 1939

INVENTOR.
Edward A. Ravenscroft
BY
Louis Quarles
ATTORNEY.

Patented Dec. 2, 1941

2,264,406

UNITED STATES PATENT OFFICE 2,264,406

RESET SLIDE RULE

Edward A. Ravenscroft, Glencoe, Ill.

Application September 5, 1939, Serial No. 293,366

2 Claims. (Cl. 235—84)

This invention relates to slide rules and resides in an arrangement of slide rule scales, preferably in circular form, which are movable in relation to one another and in relation to a stationary index; one of said movable scales being provided with means for causing the same to move in unison with the other and being provided with self-locating means for resetting a predetermined point thereof in registry with said stationary index while the remaining scale is stationary, this action being performable on the part of the operator by simple actions not requiring inspection.

While the novel apparatus of this invention depends for its computing properties upon the well-known principle of the extended logarithmic scales, this invention lends a new utility to this principle by reason of the increased speed which it makes possible in the computation of expressions involving sucessive factors. This is accomplished by the novel apparatus of this invention by rendering stationary the so-called "rider" or floating index and by endowing the scales with special properties of movement with reference thereto. While the slide rule has been constructed in a wide variety of forms, as far as I am aware, in each of the forms heretofore known at least two operations requiring careful inspection must be performed by the operator for the entry of each successive factor into the computation. In contrast in the case of the apparatus of this invention each successive factor may be entered with but one single operation requiring close inspection and a simple manual operation which does not require the close attention of the operator. Any of the various forms of scales which have been employed in slide rule construction may be successfully embodied in the apparatus of this invention.

This invention is herein described with the aid of the accompanying drawing which forms a part hereof and by reference to a specific instance of an embodiment of this invention which is set forth by way of illustration and not of limitation.

Figure 2:
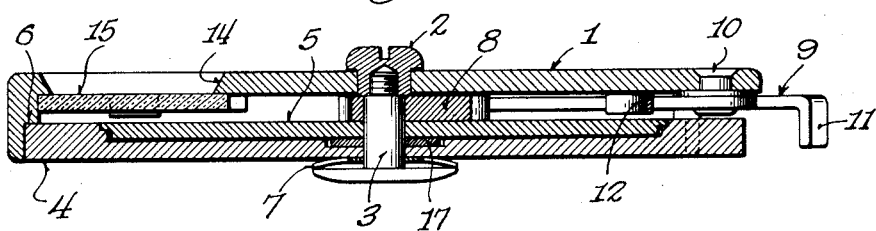

In the drawing:

Fig. 1 is a plan view, with portions broken away, showing one form of the apparatus of this invention; and Fig. 2 is a side elevation in section, viewed through the broken plane 2—2 indicated in Fig. 1.

Referring to the drawing, one form of the apparatus of this invention is shown. In this form a shallow cylindrical body member 1, having a closed upper face, is provided, a large part of said upper face being shown broken away in Fig. 1 so that the interior elements of the apparatus may be more clearly depicted. The face of the front closure of body 1 is centrally bored to receive a guiding-nut 2 in a manner which permits axial movement thereof. Secured to the guide-nut 2 by threaded engagement therewith is a center-post 3 and mounted to turn upon the center-post 3 are an external disc 4 and an internal disc 5. Each of these discs carries scale markings, to be described in greater detail hereinafter.

External disc 4 is fitted within the cylindrical rim of the body 1 to turn freely therein, but being so arranged that it may be arrested by friction at the will of the operator by urging the same against stepped land 6, which is formed as a part of the cylindrical rim of the body 1. The external disc 4 may be turned at the will of the operator or held in any position desired for the purpose hereinafter to be more fully described.

Internal disc 5 is mounted with its rear face out of contact with external disc 4, the two discs being held apart by friction washer 17 which is in frictional contact with both discs, the degree of such frictional contact being determined by the tension in a plate-spring 7, clearly shown beneath the enlarged head of center-post 3. Rigidly attached to internal disc 5 to turn therewith is a roughly heart-shaped reset cam 8, held in place by rivets, as indicated. The upper face of cam 8 is normally held in contact with the lower face of guide-nut 2 by the action of plate-spring 7, the pressure of this contact being slight but sufficient to assure that external disc 4 and internal disc 5 will move in unison when desired, the two discs, however, being capable of independent movement either by sliding in spite of the friction at washer 17 or by release of the friction due to pressure applied to center-post 3.

A cam-actuating lever 9 is pivotally mounted upon a pivot-pin 10, which is secured as shown to the body member 1 near the outer rim thereof. The lever 9 is free to move between the position shown in full lines and the position shown in dotted lines in Fig. 1. Inward movement may be caused by the operator exerting pressure upon the thumb-seat 11, which is formed as a portion of the lever 9. Outward movement of the lever 9 and its retention in the outward position when at rest is effected by a leaf-spring 12, which is secured to the inner face of the rim of body member 1, as shown.

The inward end of lever 9 carries a cam-engaging face 13 arranged to engage cam 8, regardless of the latter's position, and to cause it to turn clockwise or counterclockwise, as the case may be, to the position shown in dotted lines in Fig. 1 in the well-known manner characteristic of self-locating heart-shaped reset cams.

Adjacent the juncture between external disc 4 and internal disc 5 logarithmic scales may be provided, as shown. For convenience, the scale which is marked upon the external disc 4 adjacent said juncture will be called the answer scale and the scale upon internal disc 5 adjacent said juncture will be called the multiplying scale. In addition to these scales, a scale of uniform subdivision may be provided, surrounding the answer scale on external disc 4 and for convenience this scale will be called the logarithm scale. Internal disc 5 may also be provided with additional scales. For example, as shown in the drawing, an inverse or division scale may be placed within the multiplying scale and within the division scale may be placed a spiral scale, logarithmically divided over an arc of two revolutions, which scale may be called the second power scale.

The arrangement of scales herein shown and described is by way of illustration only, since it is apparent that any of the scales which are adaptable for use in slide rules, including logarithmic functions of all kinds, may be applied in addition to or in place of those herein described.

To provide an index for the movable scales an aperture 14 is cut in the face of body portion 1, the same being closed by a window 15 of transparent material, secured in place by appropriate means. Across the lower face of the window 15 a scratch or other suitable reference mark 16 is provided as an index.

As an instance of one of the many useful operations which may be performed with the apparatus of this invention, a simple multiplication may be performed as follows: A point designated a in Fig. 1 of the drawing and representing the quantity .562 may be brought by the operator into registry with index 16. While the external disc 4 is thus held stationary by the operator by pressing against the back surface of the instrument, the head of center-post 3 may be depressed and force exerted against the thumseat 11. This will bring the terminal of the multiplying scale, which is carried by the internal disc 5, into registry with index 16, an operation which is performable without necessitating inspection on the part of the operator. This operation having been accomplished, the instrument is in condition to multiply the factor .562 by any other factor desired simply by releasing the pressure against the back of the instrument and turning the discs 4 and 5 in unison until the desired multiplier appears on the multiplying scale beneath the index 16, whereupon the answer may be read directly from the answer scale. For example, the instrument is shown in Fig. 1 in proper position to multiply the factor .562 by the factor 1.78, the answer appearing on the answer scale being 1.00. In analogous fashion, when dividing reference is made to the inverse or dividing scale and the answer read in similar fashion upon the answer scale. If the expression to be computed contains successive factors, each successive factor may now be entered simply by resetting the internal disc 5, an operation which does not require inspection, and by turning the discs in unison until the factor in question appears beneath the index 16 on the multiplying, or dividing, or second power scale, as the case may be. It is obvious that the answer scale need not be read until the entire expression is computed and that for the entry of each successive factor but a single inspection on the part of the operator is required. By thus lightening the burden upon the operator, speed and accuracy in computation is enhanced.

If the operator prefers, guide-nut 2 may be backed off slightly to reduce the contact friction between washer 17 and discs 4 and 5, and with the instrument thus adjusted, resetting of internal disc 5 may be accomplished without necessity for depressing center-post 3. In such case the frictional contact between washer 17 and discs 4 and 5 is sufficient only to insure movement of the two discs in unison and is not sufficient to interfere with the resetting movement.

While there has been set forth herein in aid of the description of this invention, a specific embodiment thereof, it is intended that the protection of Letters Patent to be afforded hereby be not unnecessarily limited thereby, but that such protection extend to the full limit of the advance disclosed herein as represented by the scope of the claims hereto appended.

That which I claim as my invention and wish to secure by Letters Patent is:

1. An apparatus adapted for co-ordinating and resetting a pair of co-axial rotatable graduated dials which are relatively movable with reference to one another and with reference to a frame, which consists of resilient means for normally urging said dials into frictional engagement with one another to facilitate movement of the same in unison, means for relieving said resilient urging of said dials into frictional engagement whereby one of said dials is freed for independent movement, said relieving means being operative to urge the other of said dials into frictional contact with said frame simultaneously with the relieving of the friction between the two dials, and means for rotating said free dial to a predetermined position with reference to said frame when said friction between dials is relieved.

2. An apparatus adapted for co-ordinating and resetting a pair of co-axial rotatable slide rule dials which are relatively rotatable with reference to one another and with reference to a frame, which consists of a pivot post free to turn and slide in said frame for furnishing a mounting for said dials, a head upon each end of said post, a spring reacting against one of said heads for urging said dials into frictional engagement with one another and against the other head, friction means upon said frame positioned to be engaged by one of said dials when pressure is applied to said post to deflect said spring and release the pressure between the two dials, and means for causing the dial not pressed against the frame to return to a predetermined position with reference to said frame.

EDWARD A. RAVENSCROFT.